United States Patent Office 3,462,428
Patented Aug. 19, 1969

3,462,428
6,7-DISUBSTITUTED-3-CYCLOPENTYL-2H-1,2,4-BENZOTHIADIAZINE-1,1-DIOXIDES
John G. Topliss, West Caldwell, and Arnold J. Wohl, Caldwell, N.J., assignors to Schering Corporation, Bloomfield, N.J., a corporation of New Jersey
No Drawing. Filed Feb. 11, 1966, Ser. No. 526,725
Int. Cl. C07d 93/30; A61k 27/00
U.S. Cl. 260—243                                                      4 Claims

ABSTRACT OF THE DISCLOSURE

Disclosed herein are certain 6,7-disubstituted 3-cyclopentyl-2H-1,2,4-benzothiadiazine-1,1-dioxides which exhibit potent anti-hypertensive activity.

---

This invention relates to compositions of matter classified in the art of chemistry as substituted benzothiadiazines and to processes for making and using such compositions.

The invention sought to be patented, in its composition of matter aspect, is described as residing in the concept of a chemical compound having a molecular structure in which there is attached to a 1,2,4-benzothiadiazine-1,1-dioxide nucleus, otherwise unsubstituted in the heterocyclic portion of the nucleus, a cyclopentenyl substituent in the 3-position thereof and a substituent chosen from the group consisting of chloro, bromo, or trifluoromethyl, or their hereinafter described equivalents, in each of the 6- and 7-positions of the benzenoid portion of the nucleus.

The invention sought to be patented, in its process aspect, is described as residing in the concept of using the tangible embodiments of a composition of matter of the invention sought to be patented, or their hereinafter described equivalents, as the essential active ingredient of a pharmaceutical composition for the application of anti-hypertensive therapy.

The tangible embodiments of the composition aspect of the invention possess the inherent general physical properties of being high melting, white crystalline solids; are substantially insoluble in water; are soluble in aqueous alkali from which solutions the alkali metal salts may be obtained on evaporation of water; and, are soluble in polar solvents, such as lower aliphatic alcohols. Examination of compounds produced according to the hereinafter described processes reveals, upon ultraviolet and infrared spectrographic analysis, spectral data confirming the molecular structure hereinbefore set forth. For example, the C=N frequency characteristic of the cyclized nucleus is evident. The aforementioned physical characteristics, taken together with the nature of the starting materials and the mode of synthesis, positively confirm the structure of the compositions sought to be patented.

As used herein the term "cyclopentenyl" means those cyclopentenyl radicals which contain a double bond not in conjugation with the 1,2,4-benzothiadiazine-1,1-dioxide nucleus, that is, a 2-cyclopentenyl or a 3-cyclopentenyl radical.

The manner and process of making and using the invention will now be generally described so as to enable a person skilled in the art of chemistry to make and use the same.

It is preferred to employ as a starting material an X, Y-substituted-o-sulfamylaniline, or a derivative thereof, wherein X and Y are the substituents sought to have appear in the 6- and 7-positions of the 1,2,4-benzothiadiazine-1,1-dioxide nucleus. These substances may be transformed directly into the 1,2,4-benzothiadiazine-1,1-dioxide of the present invention, or they may be transformed into a further intermediate which, itself may be cyclized to form the end product. These X,Y-substituted sulfamylaniline derivatives are either known per se or may be prepared by any of the usual and well-known procedures for making such compounds.

The key step in the process is the reaction of the o-sulfamylaniline (I) with a reagent such as an ortho ester, $RC(OR')_3$, or a carboxylic acid, RCOOH, or a derivative thereof such as the corresponding acid halide, anhydride, amide and simple lower alkyl esters, or other chemically equivalent compounds which, under the reaction conditions, are convertible thereto. For each of these reactants, R is representative of the cyclopentenyl radical sought to have appear in the 3-position of the 1,2,4-benzothiadiazine-1,1-dioxide nucleus, and R' represents a lower alkyl. In these variations all reactants are essentially equivalent in ultimately producing the desired end product. Thus the reaction of 2-sulfamyl-4,5-dichloroaniline with ethyl ortho 2-cyclopentene-1-carboxylate or 2-cyclopentene-1-carboxylic acid, 2-cyclopentene-1-carbonyl chloride, 2-cyclopentene-1-carboxylic acid anhydride, or ethyl 2-cyclopentene-1-carboxylate will ultimately result in the formation of 3-(2-cyclopentenyl)-6,7-dichloro-2H-1,2,4-benzothiadiazine-1,1-dioxide. The novel compositions of matter of this invention are thus prepared by heating the o-sulfamylaniline starting material with reactants such as the above mentioned ortho esters, carboxylic acids, acid halides, and acid anhydrides.

When the carboxylic acids, acid halides or acid anhydrides are used as reactants, a catalyst may be used in order to facilitate the obtention of the desired 1,2,4-benzothiadiazine-1,1-dioxide without first isolating intermediary substances. The desired final products may also be directly formed by heating the reaction medium at higher temperatures than when a catalyst is employed. Ordinarily, the desired final product may be obtained by heating the reaction medium at about its reflux temperature, whereas the use of a catalyst would facilitate the obtention of the final desired product at considerably reduced temperatures, such as below 150° C. When used, the catalyst may be basic, such as the alkali metal hydroxides, carbonates, bicarbonates, or ammonium hydroxide, or a tertiary amine such as pyridine, picoline, or lutidine, or acidic, such as perchloric acid.

When reacting the o-sulfamylaniline with the foregoing described reactants, the reaction is generally carried out at above room temperatures. If in the absence of a solvent, the temperature range is from about 40° C. to the boiling point of the particular ortho ester, carboxylic acid, acid chloride or acid anhydride, although a temperature range of about 80–130° C. is preferred. If the reaction is effected in the presence of an inert organic solvent, the temperature is usually maintained at about the reflux temperature of the reaction mixture. Solvents such as dioxane, benzene, dimethylene glycol dimethyl ether are preferred but other suitable non-reactive solvents may also be used.

The aforementioned chemically equivalent preparations are illustrated as follows in Reaction Scheme A:

(A) 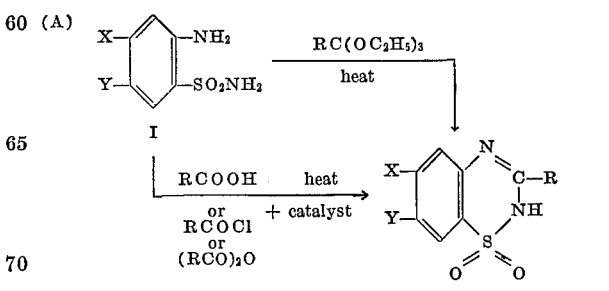

II wherein X and Y are chloro, bromo, or trifluoromethyl, or their hereinafter described equivalents, and R is cyclopentenyl.

The immediately preceding description is of reactants and reactions which in essentially one step produce an X,Y-substituted-3-R-2H-1,2,4-benzothiadiazine - 1,1 - dioxide (II). By slight variations in conditions, various intermediates are producible which themselves can be converted to one final product. For example, if the catalyst is omitted during the reaction between the o-sulfamylaniline starting material (I), and the acid halide or acid anhydride, there is produced the correspondingly N-acylated-o-sulfamylaniline intermediate (III). This reaction is generally effected in an inert aromatic hydrocarbon solvent such as benzene, toluene, xylene and the like, preferably at reflux temperatures. Other solvents such as di-alkyl ethers, cyclic ethers and such may also be used. The acylated intermediate is isolated, heated above its melting point whereupon cyclization occurs forming the appropriate 1,2,4-benzothiadiazine-1,1-dioxide (I). An example of the foregoing is the reaction of 2-sulfamyl-4,5-dichloroaniline with 2-cyclopentene-1-carbonyl chloride or 2-cyclopentene-1-carboxylic acid anhydride in refluxing toluene whereupon there is produced 2-sulfamyl-4,5-dichloro - cyclopentenanilide. Upon heating this intermediate above its melting point, there is produced 3-(2-cyclopentenyl)-6,7-dichloro - 2H - 1,2,4-benzothiadiazine-1,1-dioxide. It is apparent that by varying the o-sulfamyl starting material or the acylating agent, the various final compounds, or their hereinafter described equivalents, falling within the scope of this invention may be readily prepared.

By changing the solvent in the foregoing to a tertiary amine such as the pyridines, a diacylated intermediate (IV) is produced; one acyl group being on the aniline nitrogen atom, and the other on the sulfamyl nitrogen atom. This diacylated intermediate is cyclized to the 1,2,4-benzothiadiazine-1,1-dioxide in the like manner simply by heating above its melting point. These reactions may be illustrated as follows in Reaction Scheme B:

(B)

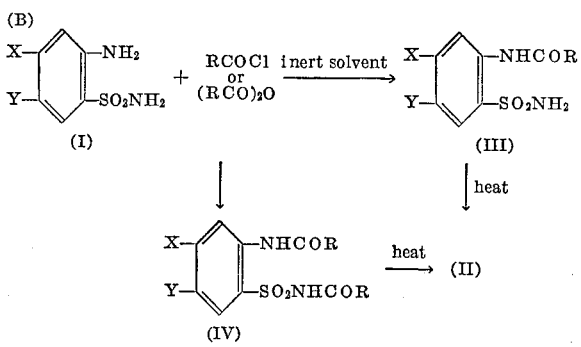

Another equivalent reaction involving a modification of the starting material is that shown in Reaction Scheme C:

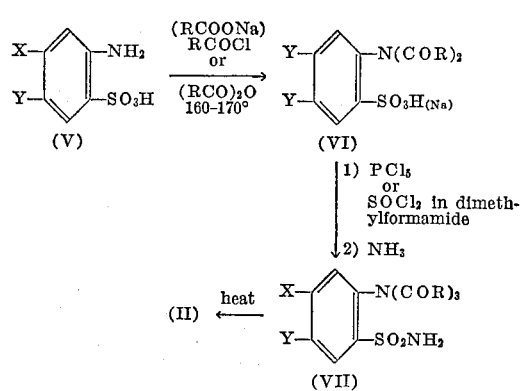

In this reaction an X,Y-substituted orthanilic acid (V) is employed as starting material and transformed as above. Diacylation produces VI (in the form of its sodium salt when RCOONa has been used.) Compound VII is transformed by known methods to the N,N-di-acyl-sulfonamide, which may spontaneously cyclize to (II) or be converted by heating to the cyclized products of this invention (II), depending on the nature of the substituents X, Y or R.

Reaction Schemes A, B, and C all employ an aniline derivative as starting material. Under some circumstances it may be desirable to utilize precursors of the aniline compounds such as sulfamyl nitrobenzenes (VIII). These substances are convertible to the novel end products (II) by reactions chemically equivalent to A, B, and C but providing different intermediates. Such a transformation is shown in Reaction Scheme D:

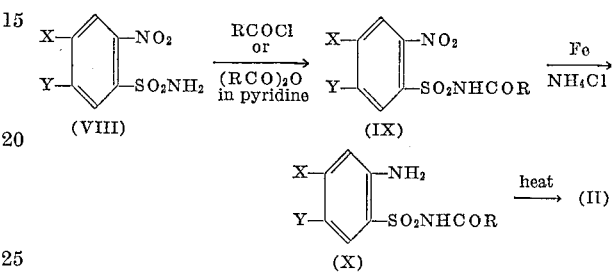

In this reaction acylation of the sulfonamide group is first effected to yield (IX) which upon reduction forms the acylated intermediate (X). It is to be noted that (X), is an isomer of (III), Scheme B, and is similarly converted to the end product (II) by heating.

In Reaction Schemes C and D, intermediary sulfonamides (VIII) and (VII) are formed by amination of sulfonyl chloride with ammonia. Equivalent compounds are produced by amination with a lower alkyl primary amine or an aralkyl amine, preferably benzyl amine. Their corresponding transformation products will carry this substituent which is eliminated during the conversion to the 1,2,4-benzothiadiazine-1,1-dioxide (I). For example, if benzyl amine is used, the starting material (I) in Scheme B would possess a benzyl substituent on the sulfamyl nitrogen atom. Thus substance is acylated as described and during the heating of the acylated product the benzyl group is eliminated and (II) is formed. An analogous reaction occurs in Schemes C, D and in that part of A pertaining to the reaction with carboxylic acids or derivatives thereof.

The ortho ester reaction of Scheme A is also applicable to the starting material (I) containing a benzyl or the desired 3-position substituent on the sulfamyl nitrogen atom. The reaction then proceeds in two steps with the formation of an intermediate (XIV) which upon heating forms (II). This is shown in Reaction Scheme E:

(E)

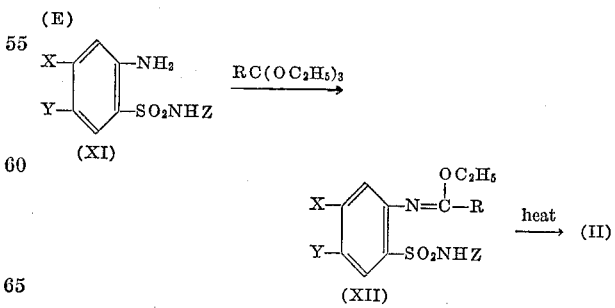

Z=benzyl or the desired 3-position substituent.

From the foregoing, it is evident to one skilled in the art of chemical synthesis that the compounds of this invention may also be manufactured by such other methods or processes as are described in published patent and technical literature.

The following examples will serve to further exemplify and illustrate the preferred method of preparation of the compounds of this invention.

EXAMPLE 1

3-(3-cyclopentenyl)-6,7-dichloro-2H-1,2,4-benzothiadiazine-1,1-dioxide

Add 12.7 g. of oxalyl chloride to a solution of 11.2 g. of 3-cyclopentene-1-carboxylic acid in 10 ml. of benzene. After 15 minutes at room temperature heat on a steam bath for 30 minutes. Dilute with 300 ml. of benzene, add 24.1 g. of 2-amino-4,5-dichlorobenzenesulfonamide and reflux the resulting mixture for 6 hrs. Cool and filter off the resulting 2-(3-cyclopentene) carbonamido-4,5-dichlorobenzenesulfonamide. Add this material to 1500 ml. of 28% ammonium hydroxide solution and reflux for 1.5 hrs. Cool, filter off the crude product and recrystallize from methanol-acetone to give the product of this example M.P. 344–346° C. By substituting equivalent quantities of 2-amino-4-chloro-5-trifluoromethylbenzenesulfonamide,
2-amino-4-bromo-5-trifluoromethylbenzenesulfonamide,
2-amino-4-trifluoromethyl-5-chlorobenzenesulfonamide,
2-amino-4,5-dibromobenzenesulfonamide, or
2-amino-4,5-difluoromethylbenzenesulfonamide in place of the 2-amino-4,5-dichlorobenzenesulfonamide, and by following substantially the same reaction procedure of this example, there is produced 3-(3-cyclopentenyl)-6-chloro-7-trifluoromethyl-2H-1,2,4-benzothiadiazine-1,1-dioxide,
3-(3-cyclopentenyl)-6-bromo-7-trifluoromethyl-2H-1,2,4-benzothiadiazine-1,1-dioxide,
3-(3-cyclopentenyl)-6-trifluoromethyl-7-chloro-2H-1,2,4-benzothiadiazine-1,1-dioxide,
3-(3-cyclopentenyl)-6,7-dibromo-2H-1,2,4-benzothiadiazine-1,1-dioxide,
3-(3-cyclopentyl)-6,7-ditrifluoromethyl-2H-1,2,4-benzothiadiazine-1,1-dioxide, respectively.

EXAMPLE 2

3-(2-cyclopentenyl)-6,7-dichloro-2H-1,2,4-benzothiadiazine-1,1-dioxide

Add 12.7 g. of oxalyl chloride to a solution of 11.2 g. of 2-cyclopentenyl-1-carboxylic acid in 10 ml. of benzene. After 15 minutes at room temperature heat on a steam bath for 30 minutes. Dilute with 300 ml. of benzene, add 24.1 g. of 2-amino-4,5-dichloro-benzenesulfonamide and reflux the resulting mixture for 6 hrs. Cool and filter the resulting 2-(2-cyclopentenyl) carbonamido-4,5-dichlorobenzenesulfonamide. Add this material to 1500 ml. of 28% ammonium hydroxide solution and reflux for 1.5 hrs. Cool, filter off the crude product and recrystallize from methanol-acetone to give the product of this example.

By substituting equivalent quantities of 2-amino-4-chloro-5-trifluoromethylbenzenesulfonamide,
2-amino-4-bromo-5-trifluoromethylbenzenesulfonamide,
2-amido-4-trifluoromethyl-5-chlorobenzenesulfonamide,
2-amino-4,5-dibromobenzenesulfonamide, or
2-amino-4,5-ditrifluoromethylbenzenesulfonamide in place of the 2-amino-4,5-dichlorobenzenesulfonamide, and by following substantially the same reaction procedure of this example, there is produced 3-(2-cyclopentenyl)-6-chloro-7-trifluoromethyl-2H-1,2,4-benzothiadiazine-1,1-dioxide,
3-(2-cyclopentenyl)-6-bromo-7-trifluoromethyl-2H-1,2,4-benzothiadiazine-1,1-dioxide,
3-(2-cyclopentenyl)-6-trifluoromethyl-7-chloro-2H-1,2,4-benzothiadiazine-1,1-dioxide,
3-(2-cyclopentenyl)-6,7-dibromo-2H-1,2,4-benzothiadiazine-1,1-dioxide,
3-(2-cyclopentenyl)-6,7-ditrifluoromethyl-2H-1,2,4-benzothiadiazine-1,1-dioxide, respectively.

The following example is illustrative of an alternative method for the preparation of the compositions of this invention:

EXAMPLE 3

3 - (3 - cyclopentenyl) - 6,7 - dichloro - 2H - 1,2,4-benzothiadiazine 1,1-dioxide (A) Ethyl ortho-3-cyclopentene-1-carboxylate.—Add 50 g. of 3-cyclopentene-1-carbonyl chloride dropwise, with stirring, to 1 l. of 28% ammonium hydroxide solution cooled in an ice bath. After 1 hr. filter off the 3-cyclopentene-1-carbonamide, wash with water and air dry. Heat an intimate mixture of 40 g. of the dry powdered amide and 80 g. of phosphorous pentoxide at 100–250°, and distil out 3-cyclopentene-1-cyanide from the reaction mixture under vacuum. Dissolve 25 g. of the cyanide in 50 ml. of absolute ethanol and bubble 10 g. of hydrogen chloride gas into the solution at 0°. Keep the solution at this temperature for 7 days. Add 500 ml. of anhydrous ether to the solution and allow to stand at room temperature overnight. Cool the reaction mixture to −40° and filter off rapidly the solid imino ester hydrochloride. Dissolve the latter in 100 ml. of absolute ethanol by stirring at room temperature and dilute the solution with 200 ml. of anhydrous ether. Reflux for 16 hrs., cool, filter off the precipitated ammonium chloride, remove the solvent and distil the residue under vacuum to obtain ethyl ortho-3-cyclopentene-1-carboxylate.

(B) Heat a mixture of 5 g. of 2-amino-4,5-dichlorobenzenesulfonamide and 15 ml. of ethyl ortho 3-cyclopentene-1-carboxylate at 100–110° C. for 1.5 hrs. Cool and filter the solids, recrystallize the desired product from methanol-acetone to yield 3-(3-cyclopentenyl)-6,7-dichloro-2H-1,2,4-benzothiadiazine-1,1-dioxide, M.P. 344–346° C.

The manner of using the invention sought to be patented in its process aspect will now be described:

It is well known that certain 1,2,4-benzothiadiazines-1,1-dioxides in their action upon the peripheral vasculature exhibit significant anti-hypertensive effects. Indeed, at one time it was thought that such compounds would enjoy a wide range of application in the alleviation and control of essential hypertension, malignant hypertension, Buerger's Disease, Raynauds' Disease and the like. Unfortunately, however, such compounds have also exhibited electrolyte retention and hyperglycemic properties which have seriously impaired their general usefulness in the alleviation and control of hypertension. In contrast to these prior art 1,2,4-benzothiadiazines-1,1-dioxides, the compounds of this invention exhibit more potent anti-hypertensive effects without concomitant electrolyte retention and hyperglycemic effects.

Various pharmacological procedures are carried out to ascertain the hypotensive, electrolyte retention, and hyperglycemic properties of the compounds of this invention. For example, the hypotensive potency of the compounds is first evaluated by administering a wide range of doses to groups of hypertensive rats (prepared by implantation of desoxycorticosterone acetate pellets, plus maintainence on saline). From statistical evaluations of the effects of this series of doses, the minimum effective dose (MED) for anti-hypertensive efficacy is determined. On the basis of this test, as well as other standard evaluative procedures such as the standard in vitro aortic strip test, it is determined that the compounds of this invention exhibit enhanced potency values relative to the heretofore mentioned prior art compounds. Similarly, when evaluated according to acceptable pharmacological techniques it is also determined that the compounds of this invention exhibit significantly lowered electrolyte retention and hyperglycemic properties when compared with the prior art 1,2,4-benzothiadiazines-1,1-dioxides. Thus, from an analysis of the pharmacological test results, it is seen that the compounds of this invention represent a significant improvement in the alleviation and control of hypertension. Quite unexpectedly, it is also found that the 3-cyclopentenyl-1,2,4-benzothiadiazines-1,1-dioxides of this invention exhibit hypotensive effects which are significantly longer in duration and of greater potency than the corresponding 3 - cyclopentyl - 1,2,4 - benzothiadiazine - 1,1-dioxides.

It is also determined that 3-cyclopentenyl-1,2,4-benzothiadiazine-1,1-dioxides having a nitro or a methyl substituent in place of one of the 6- or 7-position chloro, bromo and trifluoromethyl substituents will result in compounds in which the pharmacological profile is not materially affected. Such modified compounds, as for example, 3 - (3 - cyclopentenyl) - 6 - chloro - 7 - methyl-1,2,4-benzothiadiazine - 1,1 - dioxide, 3-(3 - cyclopentenyl) - 6-nitro - 7 - chloro - 1,2,4 - benzothiadiazine - 1,1 - dioxide are therefore equivalents of the subject matter sought to be patented and as such are embraced within the concepts of this application.

The effective dosage of the compounds of this invention depends upon the severity, the stage and the individual characteristics of each case and will be determined by an attending diagnostician. Generally a dosage range of from 0.03 to about 1 mg. per kg. of body weight per day constitutes the overall range, for the instant class of compounds.

The novel compounds of our invention may be used in the form of pharmaceutical preparations which contain the active ingredient in admixture with a pharmaceutical carrier suitable for enteral or parenteral administration. Such preparations may be in solid forms, as for example, tablets, capsules and suppositories, or in liquid forms, as for example, elixirs, emulsions and injectables.

In the formulation of pharmaceutical preparations there can be employed such substances which do not react with the active substances, as for example, water gelatin, lactose, starches, magnesium stearate, calcium carbonate, talc, vegetable oils, benzyl alcohols, gums, polyalkylene glycols, and petroleum jelly. The active ingredient is preferably present in the preparation in such proportions by weight that the proportion by weight of active ingredient in the formulation to be administered lies between 0.1% and 50%.

Representative preparations are illustrated below with the preparations administrable once to several times per day.

Tablet formulation

The following formulation provides for the manufacture of 1000 tablets:

| | Grams |
|---|---|
| (1) 3 - (3 - cyclopentenyl) - 6,7-dichloro-2H-1,2,4-benzothiadiazine-1,1dioxide | 25 |
| (2) Lactose, U.S.P. | 181 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 g. of corn starch in 100 ml. of hot distilled water. Dry the resulting granulation at 40–45° C. and pass it through a No. 16 mesh screen. To be dried, screened granulation add a blended mixture of the active ingredient (1) and the magnesium stearate. Thoroughly blend and then press into tablets of 300 mg. each.

Capsule formulation

The following formulation provides for the manufacture of 1000 capsules:

| | Grams |
|---|---|
| (1) 3 - (3 - cyclopentenyl)-6,7-dichloro-2H-1,2,4-benzothiadiazine-1,1-dioxide | 25 |
| (2) Lactose | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 3-(3-cyclopentenyl)-6,7-dichloro-2H-1,2,4-benzothiadiazine-1,1-dioxide.

Parenteral formulation

The following formulation provides for the manufacture of 1000 vials each containing 10 mg. of active ingredient, as its sodium salt:

| | | |
|---|---|---|
| (1) 3 - (3 - cyclopentenyl)-6,7-dichloro-2H-1,2,4-benzothiadiazine-1,1-dioxide sodium salt | gm | 10.95 |
| (2) Monobasic potassium phosphate | do | 6.0 |
| (3) Water for injection, U.S.P.q.s. | liter | 1.0 |

Dissolve ingredients (1), (2), and (3) in approximately 80 percent of the volume of water and filter the resulting solution. Add to the filtrate sufficient water to make a 1000 ml. volume. Sterile-filter the solution and asceptically fill one milliliter portions of the so-prepared solution into two milliliter vials then lyophylize. After the lyophilized cake is dry asceptically stopper the vials with rubber plugs and seal.

It is known to chemists that a 1,2,4-benzothiadiazine-1,1-dioxide may exist in either one or both of two tautomeric forms. In one form the double bond is between the 3- and 4-position atoms, while in the other form the double bond is between the 2- and 3-position atoms. The inventors contemplate either or both tautomeric structures as within the scope of their invention.

It is also apparent to a chemist skilled in the art that our novel compounds are acidic in character and, indeed, are soluble in aqueous alkali. The alkali metal salts of our compounds may be prepared by methods well known in the art for the preparation of a strong base with a weak acid. Although the alkaline metal salt may be obtained on evaporation of an alkaline solution of a compound of this invention, we prefer to employ non-aqueous media. For example, by mixing together an alcoholic solution of a compound of our invention with an alcoholic solution containing a stoichiometric quantity of an alkali metal alkoxide and after evaporating the solvent, there is obtained the alkali metal salts.

We claim:

1. A compound of the group consisting of 3-(2-cyclopentenyl) - 2H - 1,2,4-benzothiadiazine-1,1-dioxide; 3-(3-cyclopentenyl) - 2H - 1,2,4 - benzothiadiazine-1,1-dioxide and the nontoxic alkali metal salts thereof having a member of the group consisting of chloro, bromo, and trifluoromethyl in each of the 6- and 7-positions thereof.

2. 3 - (3 - cyclopentenyl) - 6,7 - dichloro - 2H - 1,2,4-benzothiadiazine-1,1-dioxide.

3. 3 - (3 - cyclopentenyl) - 6-trifluoromethyl-7-chloro-2H-1,2,4-benzothiadiazine-1,1-dioxide.

4. 3 - (3 - cyclopentenyl) - 6-chloro-7-trifluoromethyl-2H-1,2,4-benzothiadiazine-1,1-dioxide.

References Cited

UNITED STATES PATENTS 3,345,365    10/1967    Topliss et al. _____ 260—243

OTHER REFERENCES

Topliss et al.: J. Med. Chem., vol. 7, 269–273 (1964).

ALEX MAZEL, Primary Examiner

J. A. NARCAVAGE, Assistant Examiner

U.S. Cl. X.R.

260—556; 424—246

PO-1050
(5/69)

UNITED STATES PATENT OFFICE
CERTIFICATE OF CORRECTION

Patent No. 3,462,428      Dated August 19, 1969

Inventor(s) John G. Topliss et al

It is certified that error appears in the above-identified patent and that said Letters Patent are hereby corrected as shown below:

Column 1, lines 2 and 13-14 and column 5, line 35, the term "cyclopentyl", each occurrence, should read --cyclopentenyl--. Column 3, formula VII, that portion of the formula reading "-N(COR)$_3$" should read -- -N(COR)$_2$--. Column 5, line 23, for the term "difluoromethyl", should read --ditrifluoromethyl--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents